March 22, 1966   J. J. HARING   3,241,354
SELF-TEST MECHANISM FOR AN ANGULAR RATE GYROSCOPE
Filed July 11, 1962

INVENTOR.
JOHN J. HARING
BY *Herbert L. Davis*
ATTORNEY

United States Patent Office 3,241,354
Patented Mar. 22, 1966

---

3,241,354
SELF-TEST MECHANISM FOR AN ANGULAR RATE GYROSCOPE
John J. Haring, Fair Lawn, N.J., assignor to The Bendix Corporation, Teterboro, N.J., a corporation of Delaware
Filed July 11, 1962, Ser. No. 208,998
4 Claims. (Cl. 73—1)

This invention relates to a self-test mechanism for an angular rate gyroscope and more particularly to a novel means embodied in an angular rate gyroscope to check gimbal freedom and the speed of a motor for driving the gyro rotor.

An object of the invention is to provide a simplified self-test mechanism for an angular rate gyroscope including permanent rod magnets inserted in the rim of the rotor of the gyroscope and arranged to cooperate with an electromagnetic winding and core fixedly mounted in the gyro casing perpendicular to the rod magnets and in cooperative relation therewith so that upon energization of the electromagnetic winding a force is applied tending to bias the rod magnets toward a parallel relation therewith resulting in a torque being applied about the output axis of the gyro to check freedom of the gyro gimbal.

Another object of the invention is to provide in such a self-test mechanism means whereby reversal of the direction of energization of the electromagnetic winding will reverse the applied torque about the output axis of the gyroscope.

Another object of the invention is to provide such a self-test mechanism in which in order to check the gyro motor speed as the rotor is rotated thereby, the field produced by the rotation of the permanent rod magnets in the rotor will generate an A.C. voltage in the aforenoted electromagnetic winding effecting a voltage therein proportional to the speed at which the rotor is driven by the motor of the gyroscope.

Another object of the invention is to provide novel electromagnetic means whereby a torque may be applied to the gyro rotor and thereby about an output axis.

Another object of the invention is to provide a novel self-test mechanism for an angular rate gyroscope, including means alternately operable to check both gimbal freedom and the gyro motor speed of the rate gyroscope.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
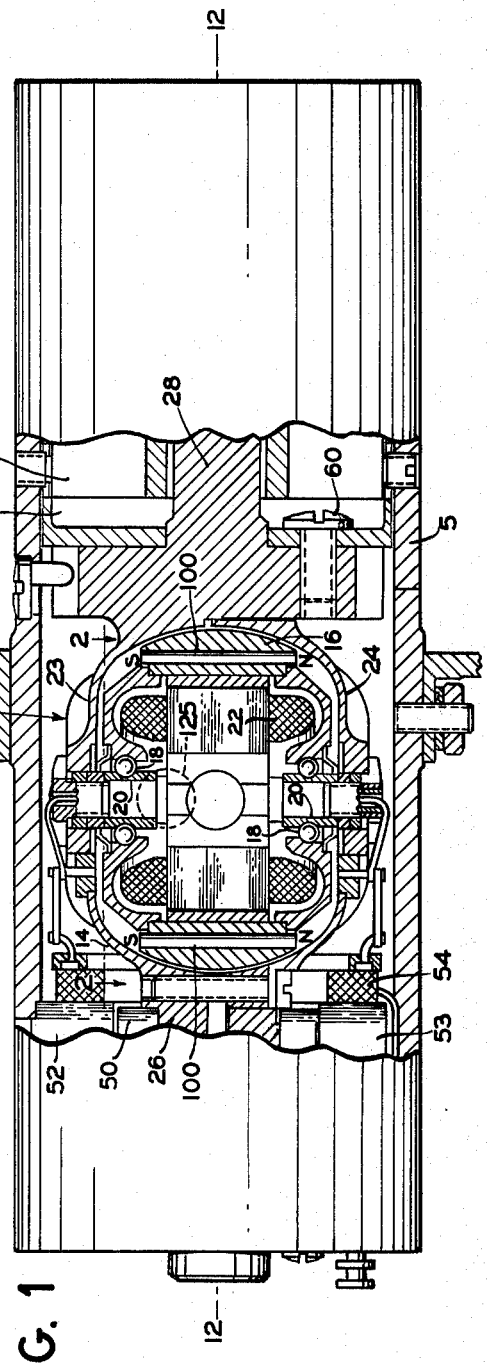
FIGURE 1 is a fragmentary sectional view of a typical angular rate gyroscope assembly embodying the novel self-test mechanism of the invention.

Referring to the drawing of FIGURE 1, there is illustrated a typical angular rate gyroscope embodying the novel self-test mechanism of the present invention. The angular rate gyroscope may be of a type disclosed and claimed in U.S. Patent No. 3,009,360, granted November 21, 1961, to Alex Morsewich and assigned to The Bendix Corporation. The gyroscope includes a casing 5 of generally cylindrical form having attached at one end a cap and mounted within the casing 5 suitable end plates for supporting the output shafts of a gyroscope indicated generally by the numeral 11 and angularly movable about the precession axis 12—12 of the gyroscope, as explained in the aforenoted patent.

A rotor case or gimbal 14 for the gyroscope 11 is disposed in a central portion of the casing 5 and has rotatably mounted therein a gyro rotor member 16 carried by bearings 18 mounted on shafts 20 and driven by a suitable electric motor 22 supported within the rotor case of gimbal 14. The rotor shafts 20 are supported at opposite ends by split upper and lower sections 23 and 24 of the gimbal 14.

Output shafts 26 and 28 are disposed at opposite ends of the gimbal 14 and are in turn supported at the opposite ends thereof by suitable torsion bars which may be of a conventional type or of a type disclosed and claimed in the U.S. Patent No. 3,009,360.

Further mounted on the output shaft 26 is a rotor element 50 cooperating with a stator element 52 of a synchro or output signal generator 53 of conventional type. The stator element 52 of the synchro 53 is affixed to the casing 5 and has suitable stator windings 54 in which may be generated an output signal upon a rotational deflection of the output shaft 26 by the gyro in a clockwise or counterclockwise sense, corresponding to a rate of turn of the gyro.

Further secured to the opposite output shaft 28 by a screw 60 is a drag cup 62 of suitable material such as copper. The drag cup 62 protrudes into a magnetic flux gap produced by a permanent magnet 64 mounted in the casing 5 and cooperates therewith so as to dampen the oscillations of the gimbal assembly 14 which is normally supported in a centralized relation by suitable torsion bars, as explained in the aforenoted U.S. Patent No. 3,009,360.

Novel self-test mechanism

The novel self-test mechanism forming the subject matter of the present invention and embodied in the aforedescribed structure includes permanent rod magnets indicated by the numeral 100 and of a material such as Alnico V or other suitable material having high coercive force and inserted in the rim of the rotor element 16 of the gyroscope formed of a suitable nonmagnetic material.

In the present case, eight permanently magnetized rods, indicated by the numeral 100, are shown is position in equal spaced relation about the rim of the rotor element 16 and along the length of the rotor in parallel relation to the rotor shaft 20. The eight permanent magnet rods 100 set up a magnetic field along the length of the rotor 16, one end of which is a north magnetic pole and the other end of which is the south magnetic pole thereof, as shown in FIGURE 1.

Figure 2:
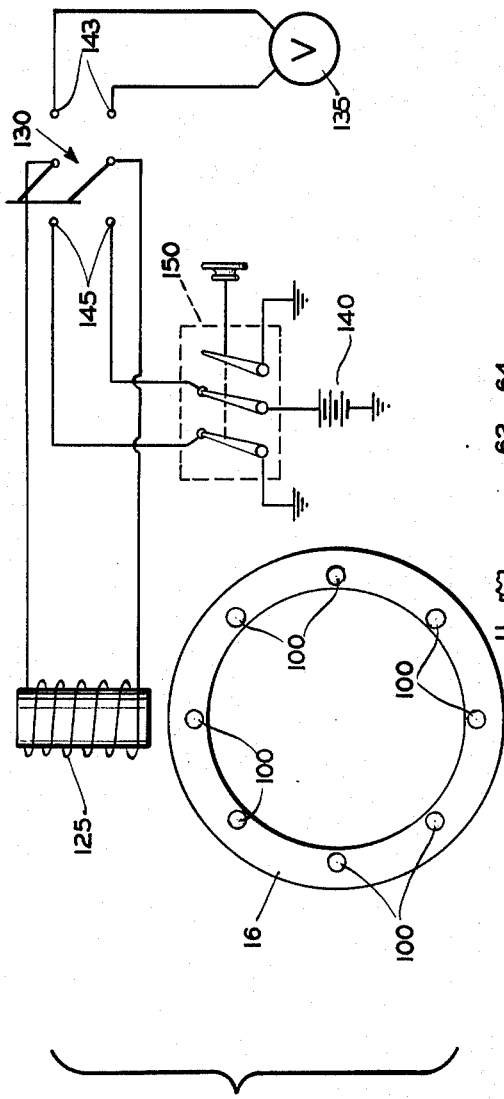
FIGURE 2 is a fragmentary sectional view of FIGURE 1 taken along the lines 2—2 and illustrating the cooperative relationship of the parts of the novel self-test mechanism including the permanent rod magnets inserted in the gyro rotor and arranged in cooperative relation with the electromagnetic winding and core fixedly mounted in the gyro casing perpendicular to the permanent magnet rods.

There is further provided an electromagnetic winding indicated by the numeral 125 mounted on a soft magnetic core and fixedly positioned in the casing 5 of the gyroscope, as shown in FIGURES 1 and 2. The electromagnetic winding 125 may have the double function of serving as a torquer or means for applying a torque to the gyro rotor 16 and also as an electrical pick-off means.

As best shown in FIGURE 2, the axes of magnetization of the core of the electromagnetic winding 125 and the permanent magnet rods 100 are perpendicular. In order to provide a maximum core and pick-off signal, the axis of magnetization of electromagnetic winding 125 is placed closer to one of the magnetic poles than to the other of the magnetic poles of the permanent magnet rods 100. In the drawing of FIGURE 1, it is shown closer to the south magnetic pole of the permanent magnet rods 100.

It will be seen then that as the motor 22 rotates, the electromagnetic field produced by the permanent magnet rods 100 generates an A.C. voltage in the electromagnetic coil 125, which voltage will be proportional to the speed of rotation of the rotor member 16. In addition to the size of the permanent magnets 100 and coil 125, other factors may limit the output. These may include the number of magnets 100 and the relative position thereof to the coil 125. As shown diagrammatically in FIGURE 2, the operator may selectively position switch 130 so as to close contacts 143 to connect the output of the electromagnetic winding 125 across a voltmeter 135 for indicating the output voltage applied across the electromagnetic winding 125 and thereby the speed of rotation of the rotor 16.

Another indication of the speed of rotation of the rotor 16 and thus the speed of the motor 22 may be effected by connecting the output of the electromagnetic winding 125 to an oscilloscope and observing the pattern effected thereby. If the output voltage of the electromagnetic voltage 135 is placed on the Y axis and the motor excitation voltage is placed on the X axis of the oscilloscope, a Lissajous pattern resembling a circle occurs when the excitation frequency of the gyro motor 22 and the pick-off frequency of the electromagnetic winding 125 are the same.

In an alternate operation of the electromagnetic winding 125, a source of direct current 140 may be selectively applied to the winding 125 by the operator selectively positioning the switch 130 so as to close the contacts 145, as shown in FIGURE 2. When the direct current is thus applied to the coil 125, there is produced a magnetic field which will react with the field produced by the permanent rod magnets 100.

The axes of magnetization of the electromagnetic coil 125 and the permanent magnet rods 100 tend to move from a perpendicular position, shown in FIGURES 1 and 2, to a relative parallel position. This action in turn causes a force resulting in the application of a torque about the output axis 12—12 of the gyroscope. The displacement of the gimbal 14 can be noted by the change in the output signal of the gyro effected at the synchro or output signal generator 53.

Moreover, by reversing the direction of the current flow from the source 140 by the operation of a suitable reversing switch mechanism 150 indicated generally in FIGURE 2, the direction of the torque applied through the electromagnetic winding 125 may be appropriately reversed about the output axis 12—12. From the foregoing, it will be seen that through the novel self-test mechanism herein provided, a direct current may be applied to the electromagnetic winding 125 to produce a force causing the rate gyroscope to be displaced about its output axis 12—12 and that this force may be reversed by reversing the direction of the current flow to effect a displacement about the output axis in an opposite sense.

Furthermore, the novel self-test mechanism may be selectively operated so that as the gyro motor 22 rotates, an A.C. voltage may be generated in the electromagnetic coil 125 proportional to the speed thereof. This voltage may in turn be applied to proper measuring instruments for appropriate speed indication.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In a testing system for a gyroscopic device of a type including a rotor case, a fixed frame, means for resiliently supporting the rotor case relative to the frame for angular movement about a precession axis thereof, said rotor case including a rotor member rotatably mounted therein about a spin axis and motor means carried by the case for driving the rotor member; the improvement in which said rotor member includes a plurality of permanent magnet rods having opposite magnetic poles, said permanent magnet rods positioned in equal spaced relation in the rim of the rotor member and extending parallel to the spin axis, an electromagnetic winding carried by the fixed frame, said electromagnetic winding including a core having an axis of magnetization extending perpendicular to the permanent magnet rods, the axis of magnetization of said core being positioned closer to one of the magnetic poles of the permanent magnet rods than to the other of the magnetic poles of said rods, and the electromagnetic winding being thereby arranged in effective cooperative relation with the permanent magnet rods for testing the device.

2. A device as defined by claim 1 including operator-operative means to selectively energize the electromagnetic winding and thereby apply a magnetic force in cooperative relation with said permanent magnet rods to apply a torque to the rotor case to angularly position said magnetic rods with the rotor member from a perpendicular position relative to the spin axis to a parallel position relative to said spin axis about the means for resiliently supporting the rotor case relative to the frame.

3. A device as defined by claim 1 including a voltage indicator means and operator-operative means for selectively connecting the electromagnetic winding to the voltage indicator means so that said permanent magnet rods may effectively induce in the winding a signal voltage proportional to the driven speed of the rotor member by the motor means and a signal voltage sensed by the indicator means as indicative of the speed of rotation of the rotor member.

4. The comination defined by claim 1 including a source of electrical energy, a voltage responsive indicator instrument, control means operative in one sense to connect the source of electrical energy to the electromagnetic winding, and said control means operative in a second sense to selectively connect said indicator means to said electromagnetic winding, said source of electrical energy being effective upon operation of said control means in said one sense to energize the electromagnetic winding so as to cooperate with the permanent magnet rods and thereby apply a torque to the rotor case to angularly position said magnetic rods with said rotor member from the perpendicular position relative to said spin axis to a parallel position relative to said spin axis and said source of electrical energy being effective upon operation of said control means in said second sense to energize the electromagnetic winding so as to cooperate with the permanent magnet rods and thereby apply a torque to the rotor case opposite to that of the first sense to angularly position said magnetic rods with the rotor member from the perpendicular position relative to said spin axis to a parallel position relative to said spin axis opposite to that of the first sense about the means for resiliently supporting the rotor case relative to the frame, and said indicator means being effective upon operation of said control means in said first sense and said second sense to render said permanent magnet rods effective to generate in said electromagnetic winding a voltage signal proportional to the driven speed of the rotor member by said motor means and to cause said voltage signal to be applied to said indicator means so as to thereby indicate the speed of rotation of the motor means in either sense.

References Cited by the Examiner
UNITED STATES PATENTS
3,077,760   2/1963   Packard _____ 73—1

ISAAC LISANN, *Primary Examiner.*